(12) United States Patent
Bayat et al.

(10) Patent No.: US 10,663,960 B2
(45) Date of Patent: May 26, 2020

(54) SYSTEM AND METHOD FOR CONTROLLING OPERATIONAL FACETS OF A COMPRESSOR FROM A REMOTE LOCATION

(71) Applicant: Bauer Compressors, Inc., Norfolk, VA (US)

(72) Inventors: Anthony B. Bayat, Virginia Beach, VA (US); Tahsin Durak, Norfolk, VA (US); Adam Z. Howard, Virginia Beach, VA (US)

(73) Assignee: Bauer Compressors, Inc., Norfolk, VA (US)

( * ) Notice: Subject to any disclaimer, the term of this patent is extended or adjusted under 35 U.S.C. 154(b) by 181 days.

(21) Appl. No.: 16/054,041

(22) Filed: Aug. 3, 2018

(65) Prior Publication Data

US 2020/0041990 A1 Feb. 6, 2020

(51) Int. Cl.
*G05B 23/02* (2006.01)
*G06F 3/0481* (2013.01)
*G05B 19/042* (2006.01)

(52) U.S. Cl.
CPC ..... *G05B 23/0272* (2013.01); *G05B 19/0425* (2013.01); *G05B 23/0216* (2013.01); *G05B 23/0283* (2013.01); *G06F 3/04817* (2013.01); *G05B 2219/24215* (2013.01)

(58) Field of Classification Search
CPC ............ G05B 19/0425; G05B 23/0216; G05B 23/0272; G05B 19/042; G05B 23/0283; G05B 19/409; G05B 15/02; G05B 11/01; G05B 13/02; G06F 3/04817; G06F 21/606; G06F 3/048; G06F 3/04842; H04L 29/06; H04L 63/0428; H04L 67/34; H04L 67/12; H04L 69/329; H04L 63/083; H04L 67/18; H04L 67/42; G06Q 10/06; G06Q 10/10; C02F 1/008; H04W 4/50; H04W 56/0025; H04W 56/0015; H04W 4/70; H04W 4/029; H04W 4/023
See application file for complete search history.

(56) References Cited

U.S. PATENT DOCUMENTS 9,489,832 B2 * 11/2016 Nair ........................ G08C 17/02
9,989,958 B2 * 6/2018 Asenjo ............... G05B 19/4185
(Continued)

*Primary Examiner* — Philip J Chea
*Assistant Examiner* — Mohammed Ahmed
(74) *Attorney, Agent, or Firm* — Peter J. Van Bergen

(57) ABSTRACT

Operational facets of a compressor are controlled from a remotely-located computer. Data from the compressor is automatically collected at a first data store every first time increment of a first time period. Portions of the data from the first data store are automatically collected at a second data store every second time increment of each first time period. The second time increment is greater than the first time increment, and the portions of the data are collected for a second time period which is greater than the first time period. Successful verification of user authentication data collected at the computer causes automatic generation of an image of application icons at the computer to enable the computer as an input device for controlling the compressor and selections of routines available at an analytics visualization generator that uses data from the second data store.

34 Claims, 5 Drawing Sheets

(56) References Cited

U.S. PATENT DOCUMENTS

| | | | | |
|---|---|---|---|---|
| 2005/0005093 A1* | 1/2005 | Bartels | ............... | G06F 21/606 |
| | | | | 713/150 |
| 2007/0163965 A1* | 7/2007 | Wolfe | ............... | C02F 1/008 |
| | | | | 210/739 |
| 2009/0089709 A1* | 4/2009 | Baier | ............... | G05B 19/409 |
| | | | | 715/817 |
| 2013/0333014 A1* | 12/2013 | Batara | ............... | G06Q 10/06 |
| | | | | 726/7 |
| 2014/0277618 A1* | 9/2014 | Nixon | ............... | H04L 67/18 |
| | | | | 700/83 |
| 2018/0063666 A1* | 3/2018 | Broodney | ............... | H04W 4/50 |
| 2018/0259338 A1* | 9/2018 | Stokes | ............... | G06T 7/70 |

\* cited by examiner

SYSTEM AND METHOD FOR CONTROLLING OPERATIONAL FACETS OF A COMPRESSOR FROM A REMOTE LOCATION

FIELD OF THE INVENTION

The invention relates generally to control and monitoring of compressor operations, and more particularly to a system and method that enables the control of multiple operational facets of a compressor from a remotely located platform.

BACKGROUND OF THE INVENTION

High-pressure compressors along with their auxiliary devices (e.g., valves, flow meters, sensors, etc.) are used for a variety of applications across a variety of industries to include compressed natural gas operations, manufacturing, industrial plants, oil/gas compression, and breathing gas systems. Efficient and safe operation of these complex compressor systems are clearly important goals for both system owners and operations personnel. While real-time monitoring of such compressor systems is a given, historical data related to past performance of the compressor system can provide critical insight into future maintenance issues and potential system faults. Past performance data can be used, for example, to adjust current operational parameters as well as predict maintenance needs. Unfortunately, past performance data as well as skilled data analysis personnel are not always available on site thereby leaving many high-pressure compressor systems vulnerable to poor performance, unexpected maintenance-issue shutdowns, and potential catastrophic failures.

SUMMARY OF THE INVENTION

Accordingly, it is an object of the present invention to provide a method and system for remotely controlling multiple operational facets of a compressor system to include real-time monitoring and remote control of compressor operations.

Another object of the present invention to provide a method and system for remotely controlling multiple operational facets of a compressor system to include report generation related to past performance of compressor operations.

Still another object of the present invention to provide a method and system for remotely controlling multiple operational facets of a compressor system to include report generation related to predictive analytics based on past performance of compressor operations.

Other objects and advantages of the present invention will become more obvious hereinafter in the specification and drawings.

In accordance with an embodiment of the present invention, a method is provided for controlling multiple operational facets of a compressor from a local computer which is remotely located with respect to the compressor and which includes a wireless transceiver. A communication interface is coupled to the compressor for relaying data from the compressor and control signals to the compressor using a wireless communication protocol. The data from the compressor is automatically collected via the communication interface at a first data store every first time increment of a first time period wherein, at a conclusion of each first time period, the first data store employs a wraparound storage scheme. Portions of the data from the first data store are automatically collected at a second data store every second time increment of each first time period. The second time increment is greater than the first time increment, and the portions of the data are collected for a second time period which is greater than the first time period. An analytics visualization generator, coupled to the second data store, is programmed with a plurality of diagnostic routines for generating visual diagnostics related to the compressor using the portions of the data in the second data store. User authentication data collected at the local computer is automatically verified with the communication interface and the analytics visualization generator. Successful verification of the user authentication data causes automatic generation of an image comprising a plurality of application icons at the local computer. Each application icon enables a connection from the local computer to one of the communication interface and the analytics visualization generator to thereby enable the local computer as an input device for origination and transmission of the control signals to the compressor and selections of the diagnostic routines to the analytics visualization generator.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
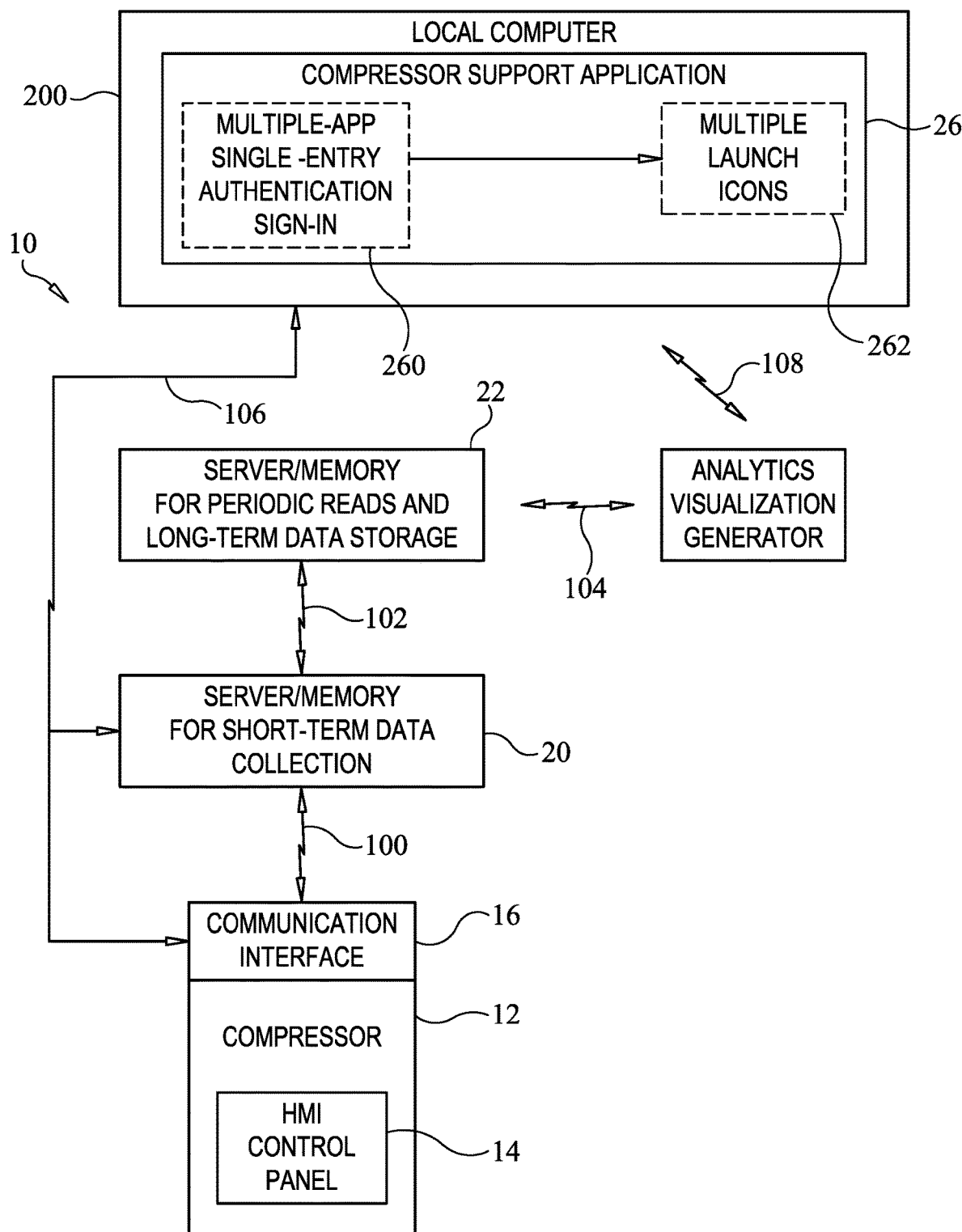
FIG. 1 is a schematic view of a compressor system that provides for control of multiple operation facets of the compressor system from a remote platform in accordance with an embodiment of the present invention.

Referring now to the drawings and more particularly to FIG. 1, a compressor system whose multiple operational facets are controlled from a remote platform in accordance with an embodiment of the present invention is shown and is referenced generally by numeral 10. As used herein, the phrase "operational facets" includes real-time monitoring of the operation of a compressor and the auxiliary devices used therewith, real-time operational control of the compressor and its auxiliary devices, past performance report generation related to the past operation of the compressor and its auxiliary devices, and predictive analytics report generation related to predicting future operation of the compressor and its auxiliary devices based on past performance data. It is further to be understood that the phrase "remote platform" includes a variety of computing devices (i.e., ones having a processor, memory, and wireless transceiver) that are remotely-located with respect to the compressor and its auxiliary devices. For example, a "remote platform" as used herein can be a hand-held wireless device such as a smart phone or tablet.

In general, communication between the various elements of compressor system 10 is accomplished in a wireless fashion over a wireless network (e.g., the internet or worldwide web) using a wireless communication protocol, the choice of which is not a limitation of the present invention. In the illustrated embodiment, wireless or other types of two-way communication are indicated by the use of two-headed arrows. For clarity of illustration, the wireless network is omitted from the drawings. Relays of the wireless communication can be carried out globally.

Compressor system 10 includes a compressor 12 that is typically part of a larger industrial, manufacturing, or other compressor-using application (not shown). As would be well-understood in the art, compressor 12 will generally include and/or be coupled to a variety of auxiliary or operation-supporting devices (not shown) such as sensors, flow meters, valves, conduits, etc. For simplicity of illustration, only a single compressor 12 is shown. However, it is to be understood that the present invention could include multiple compressors 12 without departing from the scope of the present invention. Compressor 12 includes a "human machine interface" (HMI) control panel 14 that is a touch screen display presenting a user interface locally at compressor 12 for entering inputs/commands that govern operational control of compressor 12. The particular appearance, arrangement of icons, and controllable compressor functions presented by HMI control panel 14 are not limitations of the present invention.

A communications interface 16 is coupled to compressor 12. For compressor systems utilizing multiple compressors, each such compressor will have its own communications interface 16 coupled thereto. Communications interface 16 can be integrated into the design of compressor 12 or could be added to an existing compressor 12 without departing from the scope of the present invention. In general, communications interface 16 supports wireless transmission and reception of signals. For purpose of the present invention, communications interface 16 wirelessly transmits/relays operational data from compressor 12 and wirelessly receives/relays control signals to compressor 12 as indicated by two-headed arrow 100.

The present invention automatically collects operational data from compressor 12 and automatically archives portions of the operational data for periods of time that typically span the multiple years associated with the useful life of compressor 12. As will be explained further below, the operational data is made available at a remote location for reviewing/monitoring and for use in a variety of diagnostic routines that generate a variety of visual diagnostics in the form of graphs, charts, tables, etc. The present invention uses a novel two server/memory approach to collecting operational data to support both real-time monitoring of and historical report generation related to a compressor's operational facets. As used herein, the term "server/memory" refers to a programmable device/system that supports network/internet communication and data storage. The two server/memory approach described further below provides for a new compressor operations paradigm covering the entire life span of a compressor. Further and as will be explained in greater detail below, the present invention provides for all of the above to be controlled from a remote location.

The two server/memory approach uses a first server/memory 20 that is programmed to automatically collect and store operational data related to compressor 12 for a short period of time (e.g., days) using wireless communication 100, and a second server/memory 22 that is programmed to automatically collect and store portions of the data collected/stored at server/memory 20 over a long period of time (e.g., years). While the particular designs of server/memory 20 and server/memory 22 are not limitations of the present invention, both servers/memories must be programmable and capable of wireless communication there between as indicated by two-headed arrow 102.

In general, server/memory 20 samples data from compressor 12 at a higher rate than server/memory 22 samples data from server/memory 20. Further, server/memory 20 stores the higher-sampled data for a relatively short period of time (e.g., 30 days or less), but does so using a wrap-around storage scheme. In this way, server/memory 20 collects a sufficient amount of operational data suitable for use in real-time monitoring of compressor operation, while simultaneously providing for data storage efficiency. A data sampling rate for server/memory 20 is generally ten seconds or less. For server/memory 22, a data sampling rate for periodic reads or data collection from server/memory 20 is generally at least one minute, and can be longer depending on the type of operational data being collected by server/memory 22. The periodically-collected operational data is stored/maintained at server/memory 22 to support past performance and predictive analytic reporting as will be explained further below. Accordingly, server/memory 22 is configured and programmed to store operational data for a number of years defined by, for example, the life expectancy of compressor 12.

Compressor system 10 also includes an analytics visualization generator 24 that, in general, provides a platform for storage of a number of diagnostic routines whose inputs are drawn from the periodically-stored operational data maintained at server/memory 22. In the illustrated example, visualization generator 24 communicates wirelessly with server/memory 22. Visualization generator 24 can be a custom-design hardware/software system, or can be a customizable "dashboard" of pre-programmed diagnostic visualization tools arranged in accordance with the need of a particular application. One such customizable dashboard is DOMO available from Domo, Inc., American Fork, Utah.

As mentioned above, compressor system 10 is controllable from a remote location through the use of a local computer 200 that can be a smart phone, tablet, laptop computer, desk top computer, etc. As used herein, the term "local computer" refers to any internet-accessing computer that is remotely located with respect to compressor 12 where "remotely located" includes short distances (e.g., at/near the facility housing compressor 12, across town from compressor 12, etc.) and long distances (e.g., tens, hundreds or even thousands of miles from compressor 12). For purpose of description, it will be assumed that local computer 200 is a hand-held device. Local computer 200 has a compressor support application or "app" 26 installed thereon as part of a purchase or subscription service. When activated on local computer 200, compressor support app 26 requests/prompts the user to input user authentication data (e.g., a username and password). More specifically, app 26 presents a single-entry, multiple-app authentication sign-in display 260 to provide a user with one-time authentication/verification to multiple applications. In the present invention, sign-in credentials are authenticated with communications interface 16 using wireless communications as indicated by two-headed arrow 106, and are authenticated with visualization generator 24 using wireless communications 108. It is noted that authentication with communications interface 16 can be routed directly thereto or indirectly thereto through server/memory 20 without departing form the scope of the present invention.

Upon successful verification of the user authentication data provided to app 26, app 26 receives an authentication certificate that allows app 26 to automatically generate an image 262 at local computer 200 that displays multiple launch icons, each of which enables a user of local computer 200 to initiate control of an operational facet of compressor 12. As will be explained further below, the presence of the authentication certificate on local computer 200 enhances efficiency of system 10. Control of compressor 12 via app 26 is facilitated using wireless communication with communications interface 16, while real-time monitoring, past performance report generation, and predictive analytics report generation is facilitated using wireless communication 108 with visualization generator 24.

Figure 2:
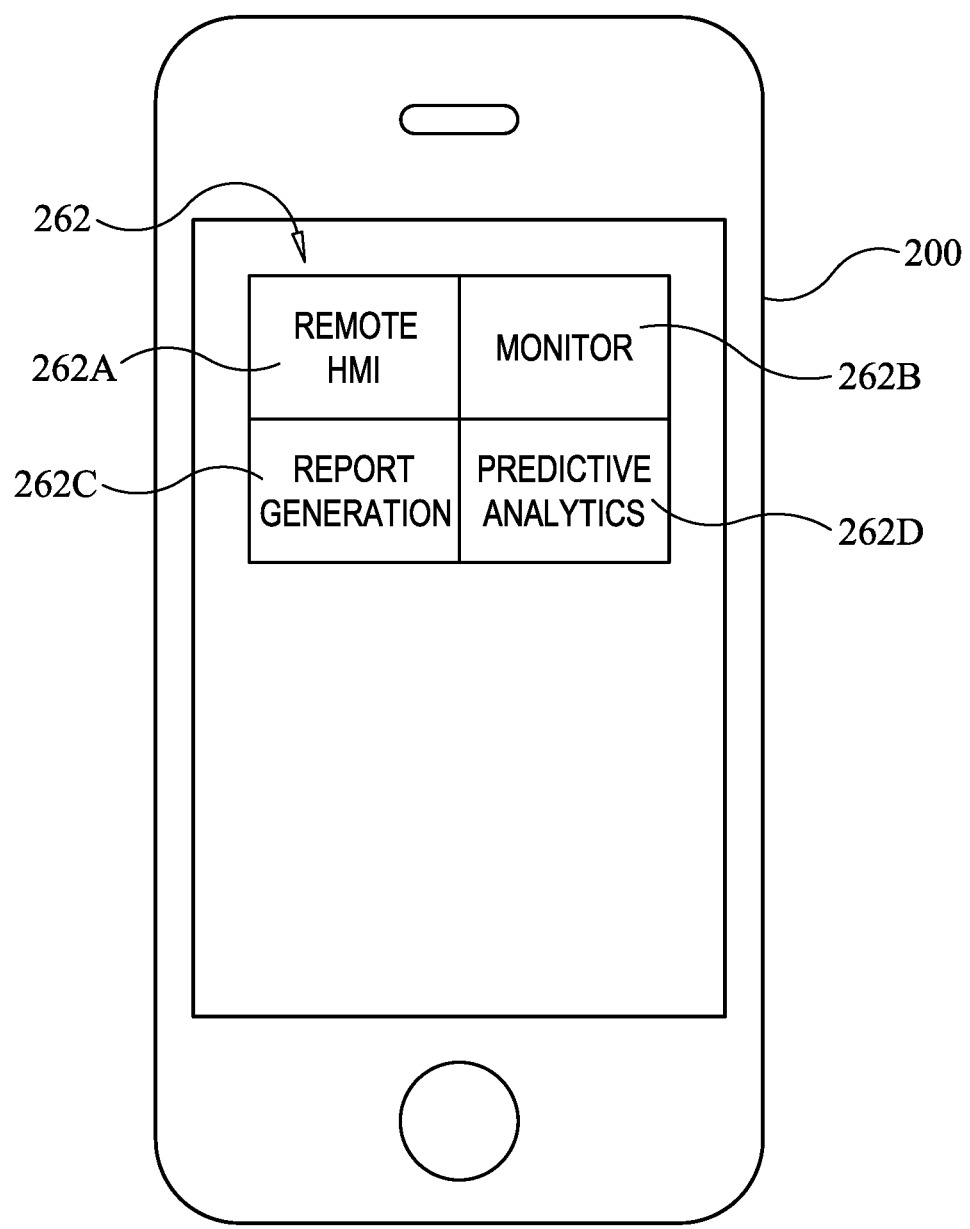
FIG. 2 is a screen image of simultaneously-illustrated application launch icons presented on a remote platform in accordance with an embodiment of the present invention.

Image 262 presents all of the apps simultaneously that have been verified for use by app 26. For example and as shown in FIG. 2, local computer 200 (e.g., a smart phone as illustrated) presents four launch application icons simultaneously. Launch icon 262A is configured to enable a wireless connection to communications interface 16 such that compressor 12 can be controlled remotely from local computer 200 as will be explained further below. Launch icon 262B is configured to enable a wireless connection to visualization generator 24 such that monitoring routines (e.g., "supervisory control and data acquisition" or SCADA routines) can be activated remotely from local computer 200. Launch icon 262C is configured to enable a wireless connection to visualization generator 24 such that a variety of report generation routines can be activated remotely from local computer 200. Launch icon 262D is configured to enable a wireless connection to visualization generator 24 such that a variety of predictive analytics report generation routines can be activated remotely from local computer 200. Additional icons and their associated apps can be made available on image 262 without departing from the scope of the present invention.

Figure 3:
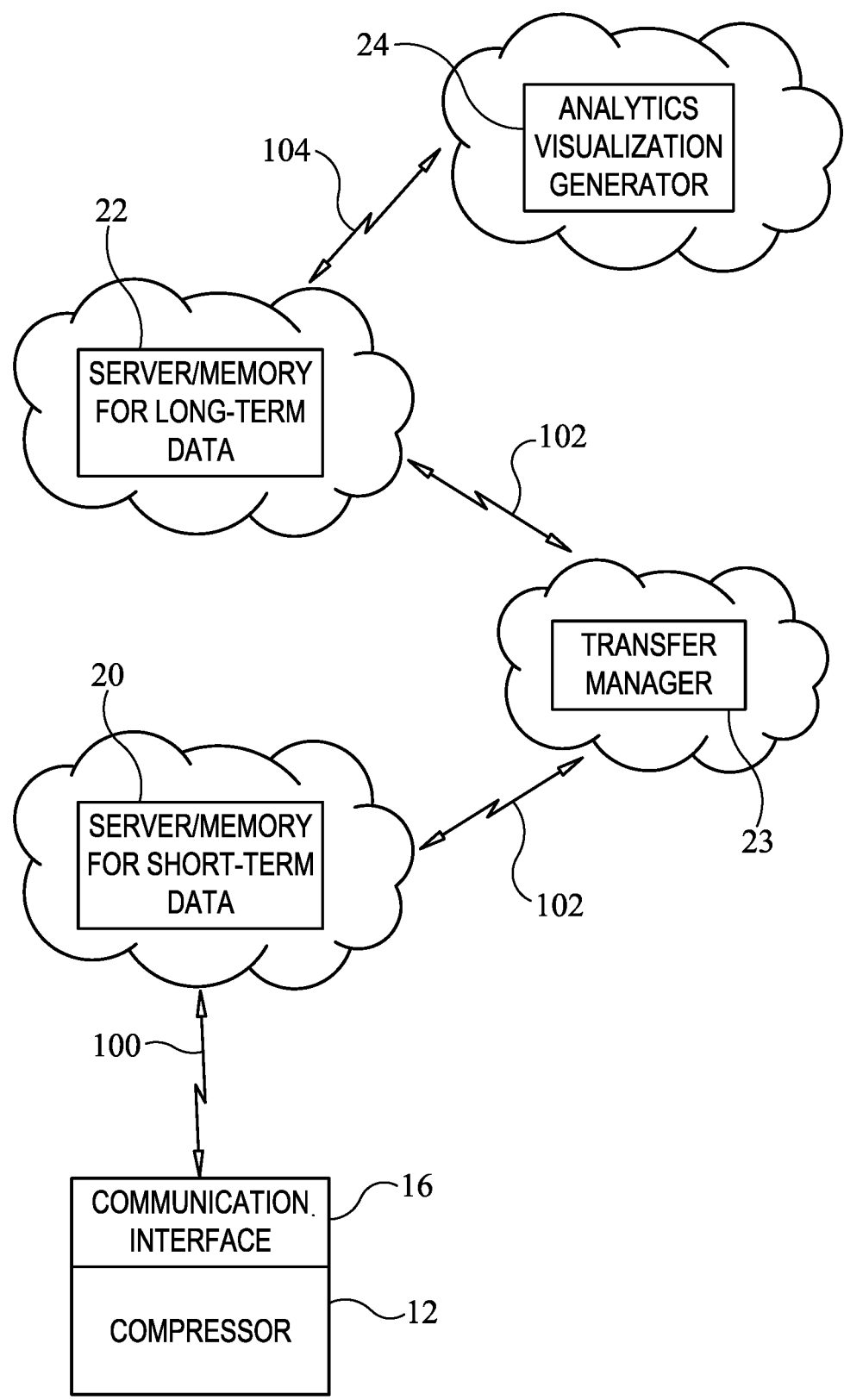
FIG. 3 is a schematic diagram illustrating the short-term and long-term data collection/storage and data utilization processes utilizing two servers/memories in accordance with an embodiment of the present invention.

Processes implemented by compressor system 10 will now be explained with reference to the schematic diagrams illustrated in FIGS. 3-5. Referring first to FIG. 3, a schematic diagram illustrates the short-term and long-term data collection/storage and data utilization processes implemented using server/memory 20 and server/memory 22. Each server/memory 20 and 22, as well as visualization generator 24, is internet-accessible or cloud-based. For example and as represented by the illustration, each can be an independent entity/system as indicated by the individual "clouds" around the entity/system. Server/memory 20 automatically collects data in real-time from compressor 12 as indicated by two-headed arrow 100 in accordance with the sampling/storage time parameters as explained earlier herein. Server/memory 22 automatically collects data from server/memory 20 as indicated by two-headed arrow 102 in accordance with the sampling/storage time parameters explained earlier herein. Visualization generator 24 can utilize the long-term data from server/memory 22 as well as the short-term data from server/memory 20. To facilitate both types of data transfers to visualization generator 24, a cloud-based transfer manager 23 provides server/memory 20 and server/memory 22 with data transfer instructions using communications 102.

As mentioned above, a large number of compressors 12 could be part of system 10. To assure processing efficiency and robust data collection, server/memory 20 has a single task, i.e., to collect data in the short-term from many compressors simultaneously. Server/memory 20 can include a backup server to carry on the short-term data collection function in the event of server malfunction without the risk of data loss. Server/memory 22 has just two functions, the first of which is to collect data associated with all compressors from server/memory 20 as a batch, e.g., using an Application Programming Interface (API). The second function of server/memory 22 is to respond to all requests from visualization generator 24. By using two servers 20 and 22, each server is better utilized owing to task specialization. Transfer manager 23 is a java based script that establishes a connection between server/memory 20 and server/memory 22 in accordance with a predetermined time period. Using an API, transfer manager 23 collects all data from server/memory 20 as a batch corresponding to compressor 12 (or a plurality of compressors as will typically be the case), and then instructs server/memory 22 to save that data for long-term archival.

Figure 4:
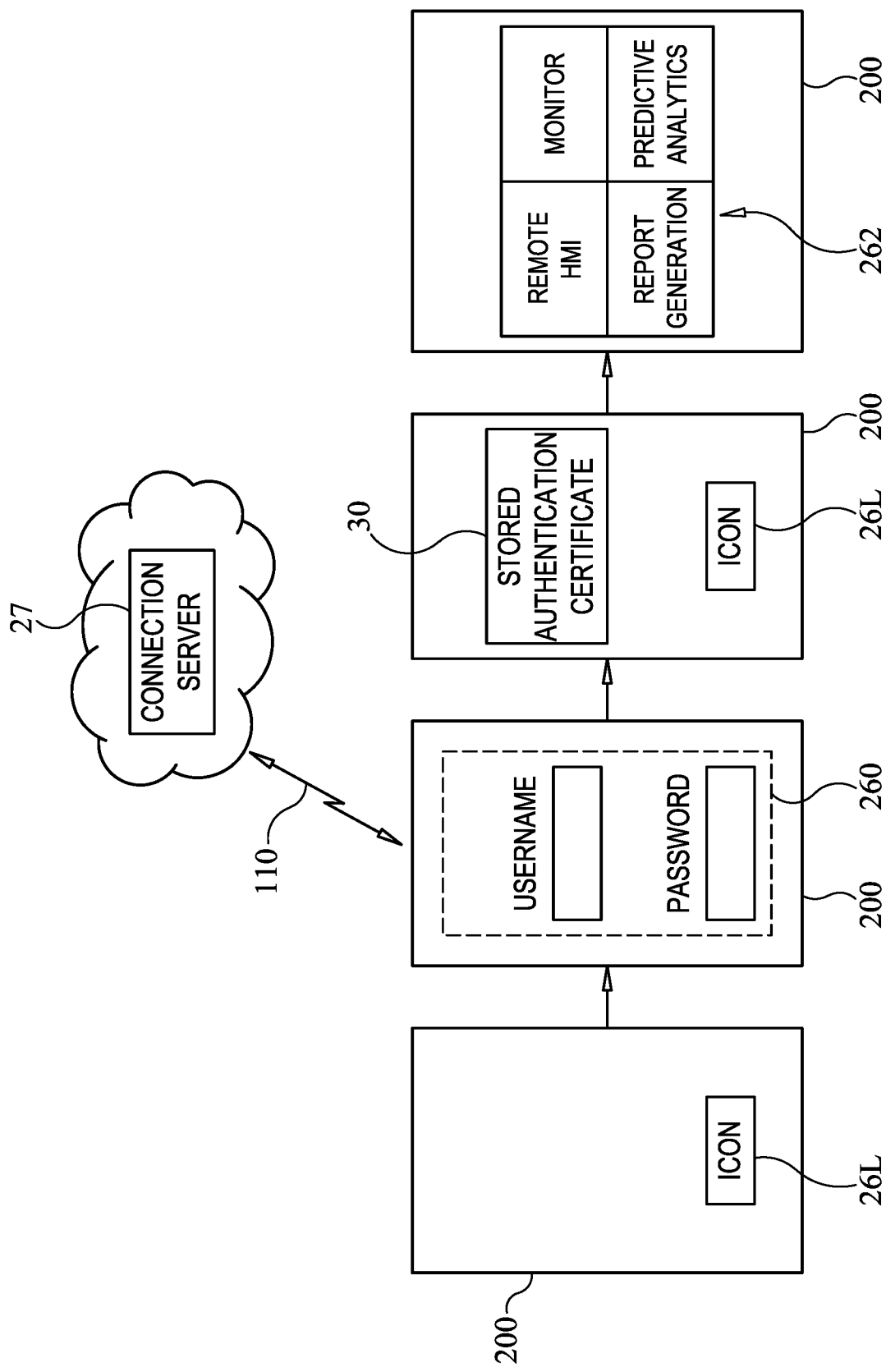
FIG. 4 is a schematic diagram illustrating the single-entry, multiple-app user authentication/verification and icon image generation process in accordance with an embodiment of the present invention.

Referring now to FIG. 4, a schematic diagram illustrates the process steps governing the single-entry, multiple-app user authentication/verification and icon image generation in accordance with an embodiment of the present invention. As described above, after app 26 is loaded onto local computer 200, user authentication across multiple applications is implemented. To minimize processing resources required at local computer 200, the present invention uses an internet-accessible connection server 27 to handle all authentication processing. Once app 26 is downloaded onto local computer 200, the app's launch icon 26L appears on local computer 200. Activating icon 26L generates sign-on display 260 to request the entry of a "USERNAME" and "PASSWORD". The entered username and password are transmitted using wireless communications 110 to connection server 27. If the username and password are verified, connection server 27 returns an authentication certificate (via two-way wireless communication 110) to local computer 200. The authentication certificate 30 is stored on local computer 200. Once stored on local computer 200, authentication certificate 30 permits the generation of the above-described image 262. That is, once authentication certificate 30 is supplied to and stored on local computer 200, activating the app's launch icon 26L causes automatic and immediate generation of image 262 thereby greatly enhancing a user's experience with system 10 as any launch icon to be included in image 262 is immediately and simultaneously made available after icon 26L is activated.

Figure 5:
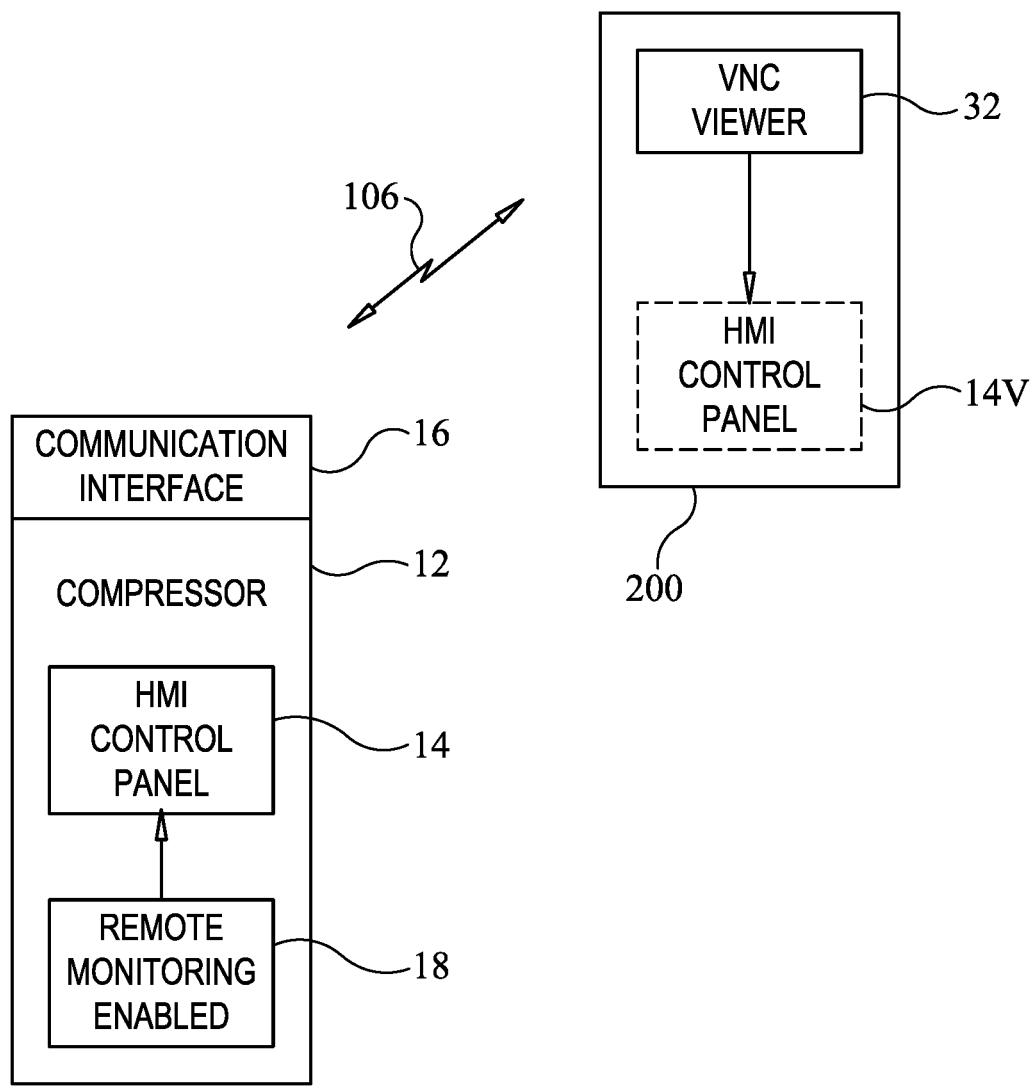
FIG. 5 is a schematic diagram illustrating establishment of remote operations control of a compressor in accordance with an embodiment of the present invention.

Referring now to FIG. 5, a schematic diagram illustrates the processing required to provide for establishment of remote control of the operations of compressor 12 from local computer 200 in accordance with an embodiment of the present invention. At compressor 12, HMI control panel 14 is enabled for remote monitoring 18 using, for example, an open source application such as SmartClient. By doing so, HMI control panel 14 is assigned an internet protocol (IP) address and login password that will be authenticated when app 26 is first launched as described above. Then, when the above-described launch icon 262A is activated via image 262, app 26 (via wireless communication indicated by two-headed arrow 106) causes a virtual network computing (VNC) viewer 32 to open at local computer 200 whereby the IP address of HMI control panel 14 on compressor 12 is read and used to transfer a virtual version 14V of HMI control panel 14 to local computer 200 for display and use such that a user has full control of HMI control panel 14 through local computer 200. Since the present invention uses the above-described single-entry authentication sign-in, the user of local computer 200 does not need to provide additional login/password credentials to access HMI control panel 14 at local computer 200. That is, once authentication certificate 30 is resident on local computer 200, activating launch icon 262A automatically establishes a virtual private network (VPN) tunnel between local computer 200 and the compressor's HMI control panel 14.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for controlling multiple operational facets of a compressor from a local computer which is remotely located with respect to the compressor and which includes a wireless transceiver, the method comprising the steps of:
   coupling a communication interface to the compressor for relaying data from the compressor and control signals to the compressor using a wireless communication protocol;
   automatically collecting said data from the compressor via the communication interface at a first data store every first time increment of a first time period wherein, at a conclusion of each said first time period, the first data store employs a wraparound storage scheme;
   automatically collecting portions of said data from the first data store at a second data store every second time increment of each said first time period, wherein said second time increment is greater than said first time increment and wherein said portions of said data are collected for a second time period which is greater than said first time period;
   coupling an analytics visualization generator to the second data store, the analytics visualization generator programmed with a plurality of diagnostic routines for generating visual diagnostics related to the compressor using said portions of said data in the second data store;
   collecting user authentication data at the local computer; and
   automatically verifying said user authentication data with the communication interface and the analytics visualization generator,
   wherein successful verification of said user authentication data permits automatic generation of an image comprising a plurality of application icons at the local computer, each of said application icons enabling a connection from the local computer to one of the communication interface and the analytics visualization generator to thereby enable the local computer as an input device for origination and transmission of said control signals to the compressor and selections of said plurality of diagnostic routines to the analytics visualization generator.

2. A method according to claim 1, wherein said first time increment is less than ten seconds, and wherein said first time period is less than thirty days.

3. A method according to claim 1, wherein said second time increment is at least one minute, and wherein said second time period comprises a plurality of years.

4. A method according to claim 1, wherein said first time increment is less than ten seconds, said first time period is less than thirty days, said second time increment is at least one minute, and said second time period comprises a plurality of years.

5. A method according to claim 1, wherein the compressor has a human machine interface (HMI) control panel for receiving inputs governing operation of the compressor, wherein the local computer includes a touch screen display, said method further includes the steps of:
   reproducing the HMI control panel on the touch screen of the local computer in response to activation of one of said application icons, wherein the local computer is enabled to receive the inputs governing operation of the compressor; and
   transmitting the inputs governing operation of the compressor received at the local computer to the compressor as said control signals.

6. A method according to claim 1, wherein the local computer comprises a hand-held wireless device.

7. A method according to claim 1, wherein the first data store comprises a portion of a first server, and wherein the second data store comprises a portion of a second server.

8. A method according to claim 1, wherein said plurality of diagnostic routines includes SCADA routines, report generation routines, and predictive analytics routines, and wherein said application icons comprise:
   a first icon configured to enable said connection to the communication interface wherein relaying said control signals to the compressor is enabled at the local computer;
   a second icon configured to enable said connection to the analytics visualization generator wherein said SCADA routines are enabled at the local computer;
   a third icon configured to enable said connection to the analytics visualization generator wherein said report generation routines are enabled at the local computer; and
   a fourth icon configured to enable said connection to the analytics visualization generator wherein said predictive analytics routines are enabled at the local computer.

9. A method according to claim 8, wherein said first icon, said second icon, said third icon, and said fourth icon appear simultaneously in said image.

10. A method for controlling multiple operational facets of a compressor from a local computer which is remotely located with respect to the compressor and which includes a wireless transceiver, the compressor including a communication interface for relaying data from the compressor and control signals to the compressor using a wireless communication protocol, the method comprising the steps of:
   automatically collecting said data from the compressor via the communication interface at a first data store every first time increment of a first time period wherein, at a conclusion of each said first time period, the first data store employs a wraparound storage scheme;
   automatically collecting portions of said data from the first data store at a second data store every second time increment of each said first time period, wherein said second time increment is greater than said first time increment and wherein said portions of said data are collected for a second time period which is greater than said first time period;
   coupling an analytics visualization generator to the second data store, the analytics visualization generator programmed with a plurality of diagnostic routines for generating visual diagnostics related to the compressor using said portions of said data in the second data store;

collecting user authentication data at the local computer; and automatically verifying said user authentication data with the communication interface and the analytics visualization generator, wherein successful verification of said user authentication data causes an authentication certificate to be stored on the local computer, wherein presence of said authentication certificate on the local computer permits generation of an image comprising a plurality of application icons at the local computer, each of said application icons enabling a connection from the local computer to one of the communication interface and the analytics visualization generator to thereby enable the local computer as an input device for origination and transmission of said control signals to the compressor and selections of said plurality of diagnostic routines to the analytics visualization generator.

11. A method according to claim 10, wherein said first time increment is less than ten seconds, and wherein said first time period is less than thirty days.

12. A method according to claim 10, wherein said second time increment is at least one minute, and wherein said second time period comprises a plurality of years.

13. A method according to claim 10, wherein said first time increment is less than ten seconds, said first time period is less than thirty days, said second time increment is at least one minute, and said second time period comprises a plurality of years.

14. A method according to claim 10, wherein the compressor has a human machine interface (HMI) control panel for receiving inputs governing operation of the compressor, wherein the local computer includes a touch screen display, said method further includes the steps of:
reproducing the HMI control panel on the touch screen of the local computer in response to activation of one of said application icons, wherein the local computer is enabled to receive the inputs governing operation of the compressor; and
transmitting the inputs governing operation of the compressor received at the local computer to the compressor as said control signals.

15. A method according to claim 10, wherein the local computer comprises a hand-held wireless device.

16. A method according to claim 10, wherein the first data store comprises a portion of a first server, and wherein the second data store comprises a portion of a second server.

17. A method according to claim 10, wherein said plurality of diagnostic routines includes SCADA routines, report generation routines, and predictive analytics routines, and wherein said application icons comprise:
a first icon configured to enable said connection to the communication interface wherein relaying said control signals to the compressor is enabled at the local computer;
a second icon configured to enable said connection to the analytics visualization generator wherein said SCADA routines are enabled at the local computer;
a third icon configured to enable said connection to the analytics visualization generator wherein said report generation routines are enabled at the local computer; and
a fourth icon configured to enable said connection to the analytics visualization generator wherein said predictive analytics routines are enabled at the local computer.

18. A method according to claim 17, wherein said first icon, said second icon, said third icon, and said fourth icon appear simultaneously in said image.

19. A method for controlling multiple operational facets of a compressor over a network from a local computer which is remotely located with respect to the compressor and which includes a wireless transceiver, the method comprising the steps of:
providing a compressor support application to a subscriber for installation on the local computer;
coupling a communication interface to the compressor for relaying data from the compressor and control signals to the compressor over the network using a wireless communication protocol;
automatically collecting said data from the compressor over the network via the communication interface at a first data store every first time increment of a first time period wherein, at a conclusion of each said first time period, the first data store employs a wraparound storage scheme;
automatically collecting portions of said data from the first data store over the network at a second data store every second time increment of each said first time period, wherein said second time increment is greater than said first time increment and wherein said portions of said data are collected for a second time period which is greater than said first time period;
coupling an analytics visualization generator to the second data store over the network, the analytics visualization generator programmed with a plurality of diagnostic routines for generating visual diagnostics related to the compressor using said portions of said data in the second data store;
collecting user authentication data at the local computer using the compressor support application,
wherein the compressor support application automatically transmits said user authentication data over the network for verification by the communication interface and the analytics visualization generator, and
wherein, following successful verification of said user authentication data, an authentication certificate is stored on the local computer, wherein presence of said authentication certificate on the local computer permits the compressor support application to automatically generate an image comprising a plurality of application icons at the local computer, each of said application icons enabling a connection from the local computer to one of the communication interface and the analytics visualization generator to thereby enable the local computer as an input device for origination and transmission of said control signals to the compressor and selections of said plurality of diagnostic routines to the analytics visualization generator over the network.

20. A method according to claim 19, wherein said first time increment is less than ten seconds, and wherein said first time period is less than thirty days.

21. A method according to claim 19, wherein said second time increment is at least one minute, and wherein said second time period comprises a plurality of years.

22. A method according to claim 19, wherein said first time increment is less than ten seconds, said first time period is less than thirty days, said second time increment is at least one minute, and said second time period comprises a plurality of years.

23. A method according to claim 19, wherein the compressor has a human machine interface (HMI) control panel for receiving inputs governing operation of the compressor, wherein the local computer includes a touch screen display, said method further includes the steps of:

reproducing the HMI control panel on the touch screen of the local computer in response to activation of one of said application icons, wherein the local computer is enabled to receive the inputs governing operation of the compressor; and transmitting the inputs governing operation of the compressor received at the local computer over the network to the compressor as said control signals.

24. A method according to claim 19, wherein the local computer comprises a hand-held wireless device.

25. A method according to claim 19, wherein the first data store comprises a portion of a first server, and wherein the second data store comprises a portion of a second server.

26. A method according to claim 19, wherein said plurality of diagnostic routines includes SCADA routines, report generation routines, and predictive analytics routines, and wherein said application icons comprise:

a first icon configured to enable said connection to the communication interface wherein relaying said control signals to the compressor is enabled at the local computer;

a second icon configured to enable said connection to the analytics visualization generator wherein said SCADA routines are enabled at the local computer;

a third icon configured to enable said connection to the analytics visualization generator wherein said report generation routines are enabled at the local computer; and a fourth icon configured to enable said connection to the analytics visualization generator wherein said predictive analytics routines are enabled at the local computer.

27. A method according to claim 26, wherein said first icon, said second icon, said third icon, and said fourth icon appear simultaneously in said image.

28. A compressor system, comprising:

a compressor;

a communication interface coupled to said compressor and configured to relay data from said compressor and control signals to said compressor over a network;

a first server having a first data store configured to automatically collect said data from said compressor over the network via said communication interface every first time increment of a first time period wherein, at a conclusion of each said first time period, said first data store employs a wraparound storage scheme;

a second server having a second data store configured to automatically collect portions of said data from said first data store over the network every second time increment of each said first time period, wherein said second time increment is greater than said first time increment and wherein said portions of said data are collected for a second time period which is greater than said first time period;

an analytics visualization generator coupled to said second data store over the network, said analytics visualization generator programmed with a plurality of diagnostic routines for generating visual diagnostics related to said compressor using said portions of said data in said second data store; and a compressor support application adapted to be installed on a local computer which has a processor, a memory and a wireless transceiver adapted for communication on the network, and which is remotely located with respect to said compressor wherein, when a user of the local computer activates said compressor support application, user authentication data is requested for input at the local computer by said compressor support application, said compressor support application automatically transmits said user authentication data input at the local computer over the network to said communication interface and said analytics visualization generator, and wherein, following successful verification of said user authentication data, an authentication certificate is stored on the local computer, wherein presence of said authentication certificate on the local computer permits said compressor support application to generate an image at the local computer, said image comprising a plurality of application icons, each of said application icons enabling a connection over the network from the local computer to one of said communication interface and said analytics visualization generator to thereby enable the local computer as an input device for origination and transmission of said control signals to said compressor and selections of said plurality of diagnostic routines over the network.

29. A compressor system as in claim 28, wherein said first time increment is less than ten seconds, and wherein said first time period is less than thirty days.

30. A compressor system as in claim 28, wherein said second time increment is at least one minute, and wherein said second time period comprises a plurality of years.

31. A compressor system as in claim 28, wherein said first time increment is less than ten seconds, said first time period is less than thirty days, said second time increment is at least one minute, and said second time period comprises a plurality of years.

32. A compressor system as in claim 28, wherein said compressor has a human machine interface (HMI) control panel for receiving inputs governing operation of said compressor, wherein the local computer includes a touch screen display, wherein activation of one of said application icons causes a reproduction of the HMI control panel on the touch screen of the local computer, and wherein the inputs governing operation of said compressor received at the local computer are transmitted over the network to said compressor as said control signals.

33. A compressor system as in claim 28, wherein said plurality of diagnostic routines includes SCADA routines, report generation routines, and predictive analytics routines, and wherein said application icons comprise:

a first icon configured to enable said connection to the communication interface wherein relaying said control signals to the compressor is enabled at the local computer;

a second icon configured to enable said connection to the analytics visualization generator wherein said SCADA routines are enabled at the local computer;

a third icon configured to enable said connection to the analytics visualization generator wherein said report generation routines are enabled at the local computer; and a fourth icon configured to enable said connection to the analytics visualization generator wherein said predictive analytics routines are enabled at the local computer.

34. A compressor system as in claim 33, wherein said first icon, said second icon, said third icon, and said fourth icon appear simultaneously in said image.

\* \* \* \* \*